(12) United States Patent
Wald et al.

(10) Patent No.: US 8,384,711 B2
(45) Date of Patent: Feb. 26, 2013

(54) RAY TRACING A THREE DIMENSIONAL SCENE USING A GRID

(75) Inventors: Ingo Wald, Salt Lake City, UT (US);
Santiago Ize, Salt Lake City, UT (US);
Steven G. Parker, Salt Lake City, UT (US); Aaron Knoll, Sandy, UT (US)

(73) Assignee: The University of Utah Research Foundation, Salt Lake City, UT (US)

( * ) Notice: Subject to any disclaimer, the term of this patent is extended or adjusted under 35 U.S.C. 154(b) by 674 days.

(21) Appl. No.: 12/515,812

(22) PCT Filed: Nov. 29, 2007

(86) PCT No.: PCT/US2007/085965
§ 371 (c)(1),
(2), (4) Date: Jan. 20, 2010

(87) PCT Pub. No.: WO2008/067483
PCT Pub. Date: Jun. 5, 2008

(65) Prior Publication Data
US 2010/0194751 A1    Aug. 5, 2010

Related U.S. Application Data

(60) Provisional application No. 60/867,781, filed on Nov. 29, 2006.

(51) Int. Cl.
*G06T 15/00* (2011.01)
(52) U.S. Cl. ......... 345/419; 345/420; 345/421; 345/423
(58) Field of Classification Search .................. 345/419, 345/420, 421, 423
See application file for complete search history.

(56) References Cited

U.S. PATENT DOCUMENTS

| 6,556,200 | B1 | 4/2003 | Pfister et al. |
| 7,289,118 | B2 * | 10/2007 | Schmittler et al. ............ 345/423 |
| 7,554,540 | B2 | 6/2009 | Hayes |
| 2004/0125103 | A1 | 7/2004 | Kaufman |
| 2006/0106815 | A1 | 5/2006 | Timcenko |
| 2007/0182732 | A1 | 8/2007 | Woop |
| 2007/0206008 | A1 | 9/2007 | Kaufman et al. |
| 2008/0043018 | A1 | 2/2008 | Keller et al. |

(Continued)

FOREIGN PATENT DOCUMENTS

| WO | WO 2008/067490 | 6/2008 |
| WO | WO2008067483 | 6/2008 |

OTHER PUBLICATIONS

International Search Report from PCT/US2007/085973, dated Jun. 2, 2008, 3 pages.

(Continued)

*Primary Examiner* — Phu K Nguyen
(74) *Attorney, Agent, or Firm* — Workman Nydegger

(57) ABSTRACT

Ray tracing a three-dimensional scene using a grid. One example embodiment is a method for ray tracing a three-dimensional scene using a grid. In this example method, the three-dimensional scene is made up of objects that are spatially partitioned into a plurality of cells that make up the grid. The method includes a first act of computing a bounding frustum of a packet of rays, and a second act of traversing the grid slice by slice along a major traversal axis. Each slice traversal includes a first act of determining one or more cells in the slice that are overlapped by the frustum and a second act of testing the rays in the packet for intersection with any objects at least partially bounded by the one or more cells overlapped by the frustum.

28 Claims, 5 Drawing Sheets

U.S. PATENT DOCUMENTS

| | | |
|---|---|---|
| 2009/0167763 A1 | 7/2009 | Waechter et al. |
| 2009/0189898 A1 | 7/2009 | Dammetz |
| 2009/0213115 A1 | 8/2009 | Keller |
| 2009/0256845 A1 | 10/2009 | Sevastianov |
| 2010/0053162 A1 | 3/2010 | Dammertz |
| 2010/0060634 A1 | 3/2010 | Wald et al. |
| 2010/0073400 A1 | 3/2010 | Wald et al. |

OTHER PUBLICATIONS

Written Opinion from PCT/US2007/085973, dated Jun. 2, 2008, 4 pages.

International Preliminary Report on Patentabiltiy from PCT/US2007/085973, dated Jun. 3, 2009, 5 pages.

International Search Report from PCT/US2007/073635, dated Aug. 5, 2008, 1 page.

Written Opinion from PCT/US2007/073635, dated Jun. 11, 2008, 4 pages.

International Preliminary Report on Patentabiltiy from PCT/US2007/073635, dated Jan. 27, 2009, 5 pages.

Wald et al., Ray tracing animated scenes using cohert grid traversal, in ACM SIGGRAPH '06 Papers (Boston, Massachusetts, Jul. 30-Aug. 3, 2006), SIGGRAPH '06, ACM, New York, NY, pp. 485-493.

Ize, T. et al. "An Evaluation of Paralled Grid Construction for Ray Tracing Dynamic Scenes," Interactive Ray Tracing 2006, IEEE Symposium on Sep. 2006, pp. 47-55.

International Search Report from PCT/US2007/085965, dated Apr. 17, 2008, 1 page.

Mahovsky, "Ray Tracing with Reduced-Precision Bounding Volume Hierarchies" Submitted Jan. 2005.

Mahovsky et al., "Memory-Conserving Bounding Volume Hierarchies with Coherent Ray Tracing" IEEE Jun. 22, 2006.

Reshetov et al. "Multi-Level Ray Tracing Algorithm," ACM 2005.

U.S. Appl. No. 12/374,392, mailed Aug. 3, 2010, Office Action.

U.S. Appl. No. 12/374,392, mailed Jan. 19, 2011, Office Action.

U.S. Appl. No. 12/374,392, mailed Sep. 28, 2011, Office Action.

U.S. Appl. No. 12/374,392, mailed Feb. 15, 2012, Notice of Allowance.

U.S. Appl. No. 12/374,392, mailed May 7, 2012, Notice of Allowance.

\* cited by examiner

RAY TRACING A THREE DIMENSIONAL SCENE USING A GRID

CROSS-REFERENCE TO RELATED APPLICATIONS

The present application claims priority to PCT International Application No. PCT/US2007/085965, having a international filing date of 29 Nov. 2007 and entitled "Ray Tracing A Three Dimensional Scene Using a Grid;" and claims the benefit of U.S. Provisional Application No. 60/867,781, filed Nov. 29, 2006 and entitled "Ray Tracing Using Coherent Grid Traversal," both of which are incorporated herein in their entirety.

This invention was made with government support under Award 190 B524196 awarded by the United States Department of Energy. The Government has certain rights to this invention.

BACKGROUND

In computer graphics, various methods have been developed for rendering a three-dimensional scene. One rendering method is ray tracing. Ray tracing is a global illumination rendering method that is able to render advanced visual effects such as reflection, refraction, and shadows. Ray tracing works by modeling and tracing the paths of individual rays of light as those rays make contact with objects within a three-dimensional scene. Ray tracing is thus capable of rendering a more realistic view of a scene than other rendering methods that are incapable of modeling reflection, refraction, and shadows.

In ray tracing, a single real-world item in a three-dimensional scene is typically modeled as multiple objects. Typical objects include points, lines, two-dimensional shapes, and three-dimensional shapes. For example, one commonly used object is a triangle, and a single real-world item in a three-dimensional scene can be modeled, for example, as thousands or millions of triangles. Given a real-world item in a three-dimensional scene that is modeled as thousands or millions of objects, the main objective of ray tracing the item is to determine how a given number of rays intersect with the objects that make up that item in the three-dimensional scene. Because of the high number of objects in even relatively basic three-dimensional scenes, simply testing each the ray against each object is very inefficient. Often ray tracing methods reduce the number of these intersection tests by using acceleration data structures to accelerate ray tracing. One such data structure is a grid.

A grid is a data structure that includes a plurality of cells that each defines a volume of three-dimensional space. Grids enable ray tracing applications to perform a relatively low-cost test to determine if a ray is in the general vicinity of an object before having to perform a relatively high-cost test to determine if the ray intersects with the object. In the event that the relatively low-cost test determines that the ray is not in the general vicinity of the object, the relatively high-cost test can be avoided altogether, thus resulting in a lower overall cost of ray tracing a scene.

For example, the objects that make up a three-dimensional scene can be spatially partitioned into the cells of a grid. Each object in the scene corresponds either to a single cell (where the object is bounded by the single cell) or to a group of cells (where the object is bounded by the group of cells).

Using this grid, where an object is bounded by a single cell, a ray tracing method can first perform a relatively low-cost test for an intersection between a ray and the cell. Where the ray does not intersect the cell, the ray tracing method can avoid a relatively high-cost test for an intersection between the ray and the object, since it is known that where the ray does not intersect with a cell the ray will also not intersect with any objects bounded by the cell. Similarly, where an object is bounded by a group of cells, a ray tracing method can first perform relatively low-cost tests for intersection between a ray and each cell in the group of cells. Where the ray does not intersect any of the cells in the group of cells, the ray tracing method can avoid a relatively high-cost test for an intersection between the ray and the object, since it is known that where a ray does not intersect with a group of cells, the ray will also not intersect with any objects bounded by the group of cells. A grid can thus be used to lower the number of relatively costly intersection tests between a ray and the objects in a scene.

Unfortunately however, even using a grid, a typical ray tracing method may nevertheless remain very costly in terms of time and processing resources, due in part to a large number of rays that must be traced through a three-dimensional scene. For example, if the final desired pixel resolution for a three-dimensional scene is 800×600, some ray tracing methods would initially assign one ray to each pixel, resulting in 480,000 rays that must be traced through the scene. The number of cell intersection tests and object intersection tests required to trace each of the 480,000 rays one-by-one can make rendering the scene using ray tracing very costly in terms of time and processing resources compared to other rendering methods such as Z-buffering. The time it takes to ray trace a scene can be excessively slow to make ray tracing a viable alternative to other rendering methods, especially for applications that make use of dynamically changing scenes with multiple frames per second, such as simulation and game applications.

SUMMARY OF SOME EXAMPLE EMBODIMENTS

In general, example embodiments of the invention relate to ray tracing and, in particular, to methods for ray tracing a three-dimensional scene using a grid. The example methods disclosed herein enable a three-dimensional scene to be ray traced relatively quickly and efficiently.

A first example embodiment is a method for ray tracing a three-dimensional scene using a grid. In this example method, the three-dimensional scene is made up of objects that are spatially partitioned into a plurality of cells that make up the grid. The method includes a first act of computing a bounding frustum of a packet of rays, and a second act of traversing the grid slice by slice along a major traversal axis. Each slice traversal includes a first act of determining one or more cells in the slice that are overlapped by the frustum and a second act of testing the rays in the packet for intersection with any objects at least partially bounded by the one or more cells overlapped by the frustum.

A second example embodiment is one or more computer-readable media having computer-readable instructions thereon which, when executed, implement the method for ray tracing a three-dimensional scene described above in connection with the first example embodiment.

A third example embodiment is a method for ray tracing a three-dimensional scene made up of objects using a grid that includes a plurality of cells. The method includes a first act of spatially partitioning a scene of objects into a grid, a second act of computing a bounding frustum of a packet of coherent rays, a third act of traversing the grid slice by slice along a major traversal axis, and a fourth act of repeating the first three acts using an altered scene of objects. Each slice traversal includes a first act of determining one or more cells in the slice that are overlapped by the frustum and a second act of testing the rays in the packet for intersection with any objects at least partially bounded by the one or more cells overlapped by the frustum.

These and other aspects of example embodiments of the invention will become more fully apparent from the following description and appended claims.

BRIEF DESCRIPTION OF THE DRAWINGS

To further clarify the above and other aspects of example embodiments, a more particular description of these example embodiments will be rendered by reference to specific embodiments thereof which are disclosed in the appended drawings. It is appreciated that these drawings depict only example embodiments of the invention and are therefore not to be considered limiting of its scope. It is also appreciated that the drawings are diagrammatic and schematic representations of example embodiments, and are not limiting of the invention nor are they necessarily drawn to scale. Example embodiments will be disclosed and explained with additional specificity and detail through the use of the accompanying drawings in which.

DETAILED DESCRIPTION OF SOME EXAMPLE EMBODIMENTS

Figure 1A:
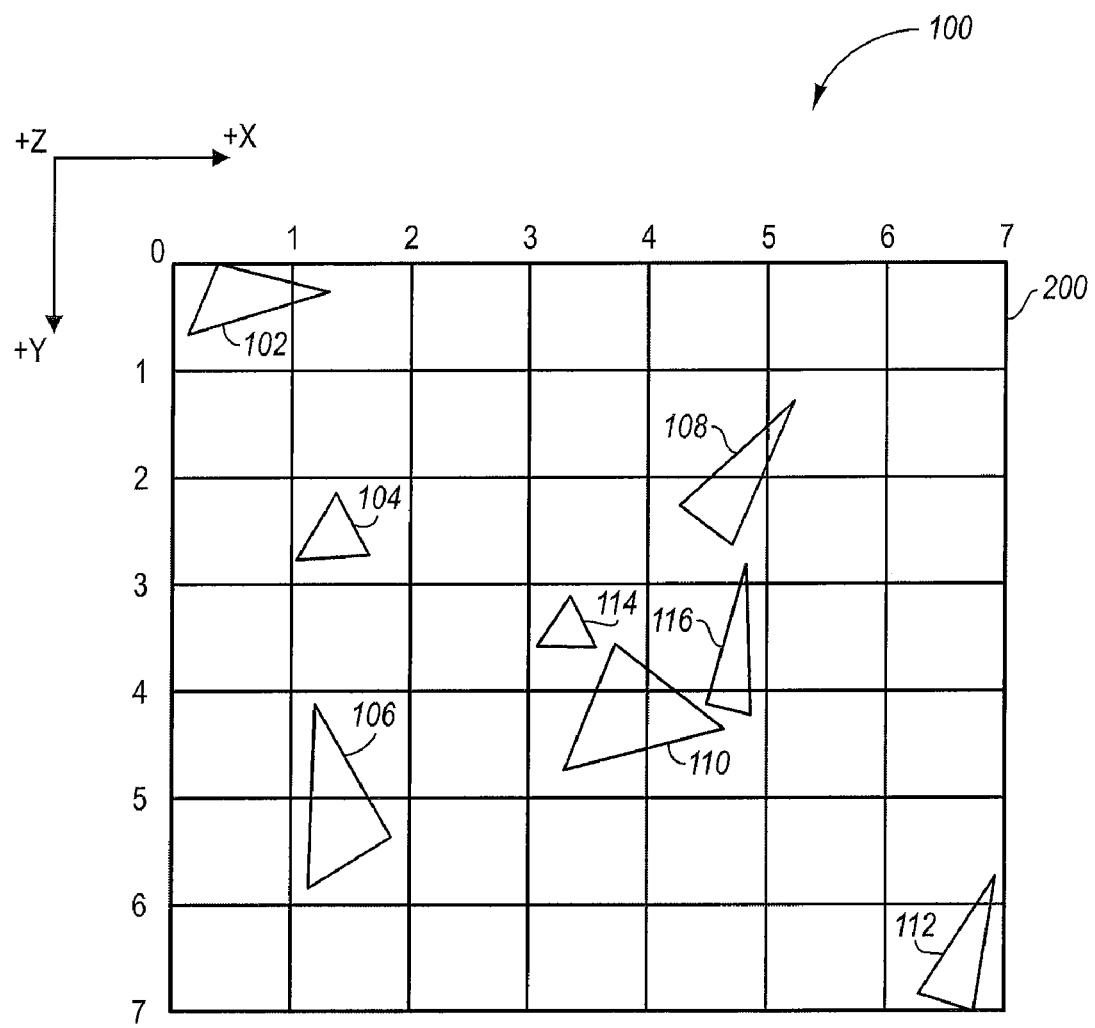
FIG. 1A is a schematic illustration of an example three-dimensional scene that is spatially divided into an example grid.

As noted above, example embodiments relate to ray tracing and, in particular, to methods for ray tracing a three-dimensional scene using a grid. The example methods disclosed herein enable a three-dimensional scene to be ray traced quickly and efficiently.

As used herein, the term "grid" is defined as a data structure including a plurality of cells that each defines a volume of three-dimensional space. The volume of three-dimensional space defined by each cell can have any three-dimensional shape including, but not limited to a cube, cuboid, or a rectangular box. In addition, the volume defined by a cell may be filled by a bounding box defined by an acceleration structure. A grid may be uniform with each cell having substantially identical shape and size as all other cells. A grid may also be non-uniform with at least one cell having a different shape and/or different size from at least one other cell. In one example embodiment, a grid may include only contiguous cells. In another example embodiment, a grid may include non-contiguous cells.

As used herein, the term "object" is defined as a data structure that defines a volume in three dimensional space. For example, objects may include, but are not limited to, points, lines, two-dimensional shapes (such as triangles), three-dimensional shapes, and/or acceleration data structures including, but not limited to, grids, kd-trees, bounded volume hierarchies (BVHs), octrees, and BSPs.

Where an object is described herein as being "bounded by" a first cell, it should be understood that this terminology refers to the volume defined by the object being completely spatially bounded within the volume defined by the first cell. Similarly, where an object is described herein as being "bounded by" a first cell and a second cell, it should be understood that this terminology refers to the volume defined by the object being completely spatially bounded within a volume defined by combining the volumes defined by the first and second cells, with some portion of the volume defined by the object being spatially bounded within each of the volumes defined by the first and second cells. Also, where an object is described herein as being "at least partially bounded by" a first cell, it should be understood that this terminology refers to at least some portion of the volume defined by the object being spatially bounded within the volume defined by the first cell. Further, where an object is described herein as being "at least partially bounded by" a first cell and a second cell, it should be understood that this terminology refers to at least some portion of the volume defined by the object being spatially bounded within a volume defined by combining the volumes defined by the first and second cells.

Also, where a ray is described herein as "hitting" a cell, it should be understood that this terminology refers to the ray intersecting with the volume defined by the cell. Conversely, where a ray is described herein as "missing" a cell, it should be understood that this terminology refers to the ray not intersecting with the volume defined by the cell.

The example methods disclosed herein and variations thereof can be implemented using computer-readable media for carrying or having computer-executable instructions or data structures stored thereon. Such computer-readable media can be any available media that can be accessed by a processor of a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed and executed by a processor of a general purpose or special purpose computer. Combinations of the above should also be included within the scope of computer-readable media.

Computer-executable instructions comprise, for example, instructions and data which cause a processor of a general purpose computer or a special purpose computer to perform a certain function or group of functions. The computer-executable instructions may be, for example, binaries, intermediate format instructions such as assembly language, or even source code. Although the subject matter is described herein in language specific to methodological acts, it is to be understood that the subject matter defined in the appended claims is not necessarily limited to the specific acts described herein. Rather, the specific acts described herein are disclosed as example forms of implementing the claims.

The example methods disclosed herein may be practiced in network computing environments with many types of computer system configurations, including, but not limited to, personal computers, desktop computers, laptop computers, hand-held devices, multi-processor systems, microprocessor-based or programmable consumer electronics, network PCs, minicomputers, mainframe computers, mobile telephones, and PDAs. Example embodiments may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In one example embodiment, methodological acts can be implemented in a ray tracing application. The ray tracing application can be a software application and/or a hardware application. The ray tracing application can include computer executable instructions that perform each of the example acts disclosed herein.

1. Example Grid

FIG. 1A illustrates an example three-dimensional scene 100 that is spatially divided into an example grid 200. The example grid 200 includes a plurality of cells. Although the cells of the example grid 200 are schematically illustrated as two-dimensional rectangular shapes in FIG. 1A, it is noted that the cells of the example grid 200 are actually three-dimensional rectangular boxes. Thus, the example grid 200 is actually a (7×7×7) grid with 7 cells in the X direction, 7 cells in the Y direction, and 7 cells in the Z direction. Although the example grid 200 is illustrated as having only 343 cells, it is understood that the grid may have any number of cells, and indeed would likely have many thousands, millions, or billions of cells when used by a ray tracing application. Although the example grid 200 is schematically illustrated as a uniform grid, example embodiments of the methods disclosed herein can alternatively use a non-uniform grid.

As schematically illustrated in FIG. 1A, the scene 100 is made up of objects 102-116. Although the objects 102-116 in the scene 100 are illustrated as triangles, the example methods disclosed herein could alternatively ray trace a scene made up of other objects disclosed elsewhere herein.

2. Example Packet of Rays

As noted above, a three-dimensional scene made up of objects can be spatially partitioned into a grid. The grid can then be used by a ray tracing application to decrease the number of ray intersection tests that are necessary in order to render the scene using a ray tracing rendering method. Instead of considering each ray individually, however, the example methods disclosed herein consider packets of rays. For example, a packet may include, for example, 4 rays, 16 rays, 256 rays, or more. In some example embodiments, the rays in the packet can correspond to a block of pixels that a ray tracing method is in the process of rendering. Specifically, a packet containing 4 rays can correspond to a 2×2 block of pixels, a packet containing 16 rays can correspond to a 4×4 block of pixels, and a packet containing 256 rays can correspond to a 16×16 block of pixels. A packet of rays may alternatively include an odd number of rays, such as 21 rays corresponding to a 3×7 block of pixels, or 23 rays which do not have a 1-to-1 correspondence to a block of pixels to be rendered.

Figure 1B:
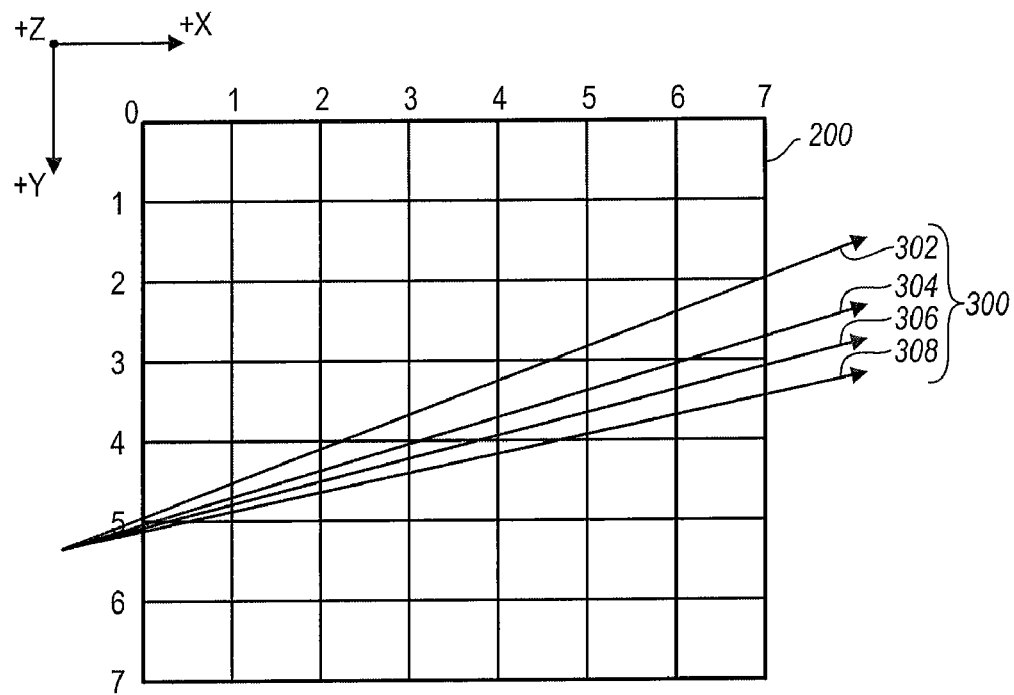
FIG. 1B is a schematic illustration of the example grid of FIG. 1A intersected by an example packet of rays.

FIG. 1B illustrates an example packet 300 of example rays 302-308. As disclosed in FIG. 1B, the rays 302-308 in the packet 300 are coherent, although other example embodiments of the methods disclosed herein can be implemented with rays that are not coherent. Although the example packet 300 includes only four rays, it is understood that the example methods disclosed herein can employ packets having less than four rays and/or greater than four rays.

Given the packet 300 of rays 302-308, a major traversal axis of the rays 302-308 can be determined. For example, a ray tracing application can first transform the packet 300 of rays 302-308 into a canonical grid coordinate system, in which a grid of $N_x \times N_y \times N_z$ cells maps to the three-dimensional region of $[0 \ldots N_x] \times [0 \ldots N_y] \times [0 \ldots N_z]$. In that coordinate system, the cell coordinates of any three-dimensional point p can be computed simply by truncating it. Then, the ray tracing application can pick the dominant component (the $\pm X$, $\pm Y$, or $\pm Z$ axis) of the direction of the one or multiple rays as the major traversal axis. For example, the major traversal axis of the packet 300 in FIG. 1B may be determined to be the X axis.

Figure 1C:
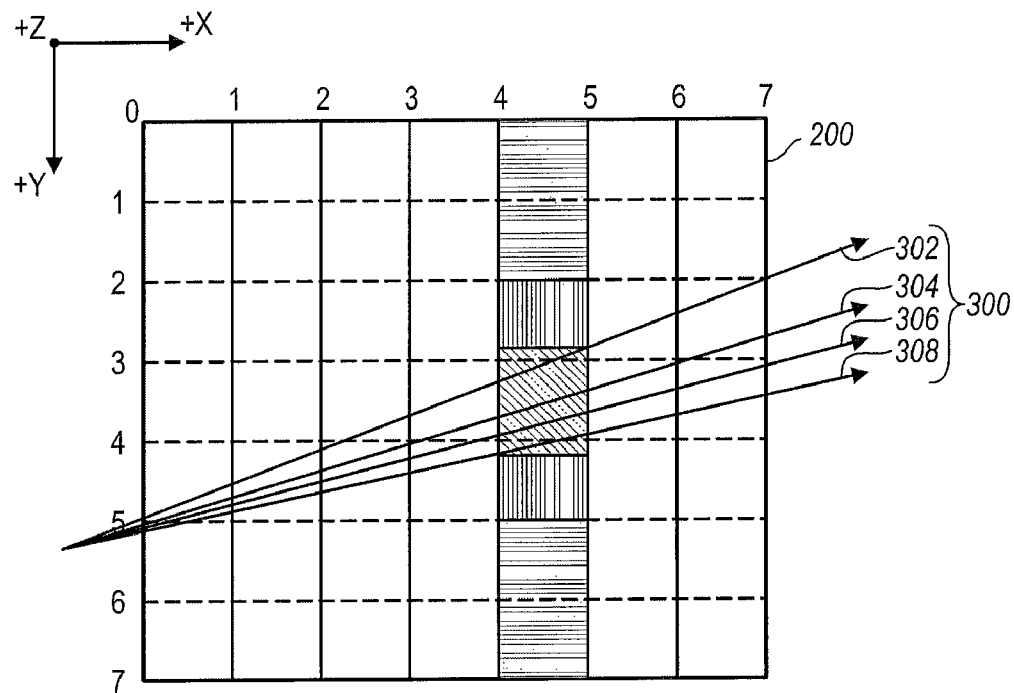
FIGS. 1C-1E are schematic illustrations of the example grid of FIGS. 1A and 1B and the example packet of rays of FIG. 1B intersecting a slice of the grid within an axis aligned bounded box.
Figure 1D:
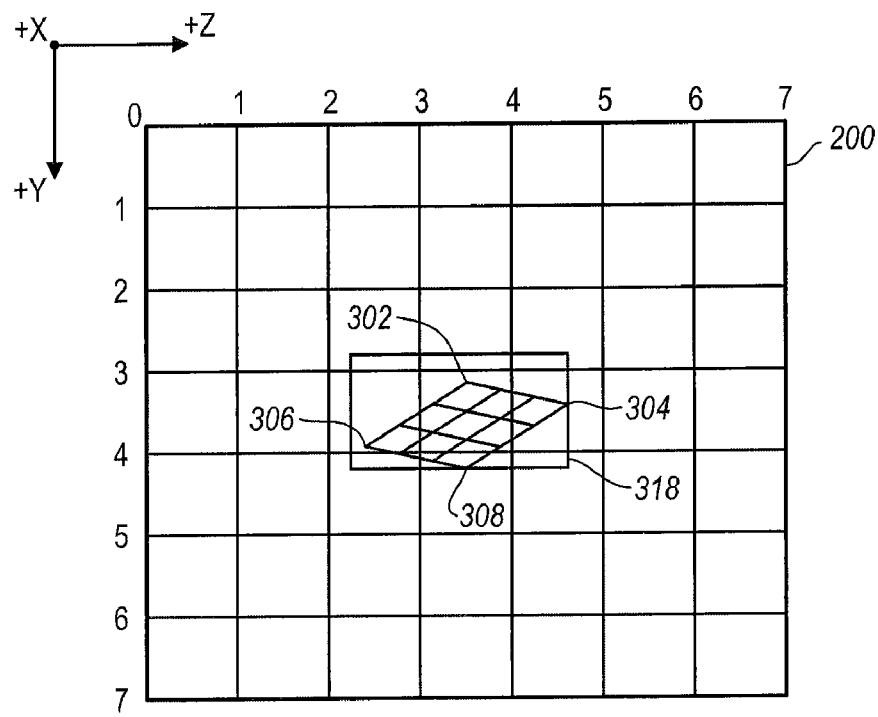
Figure 1E:
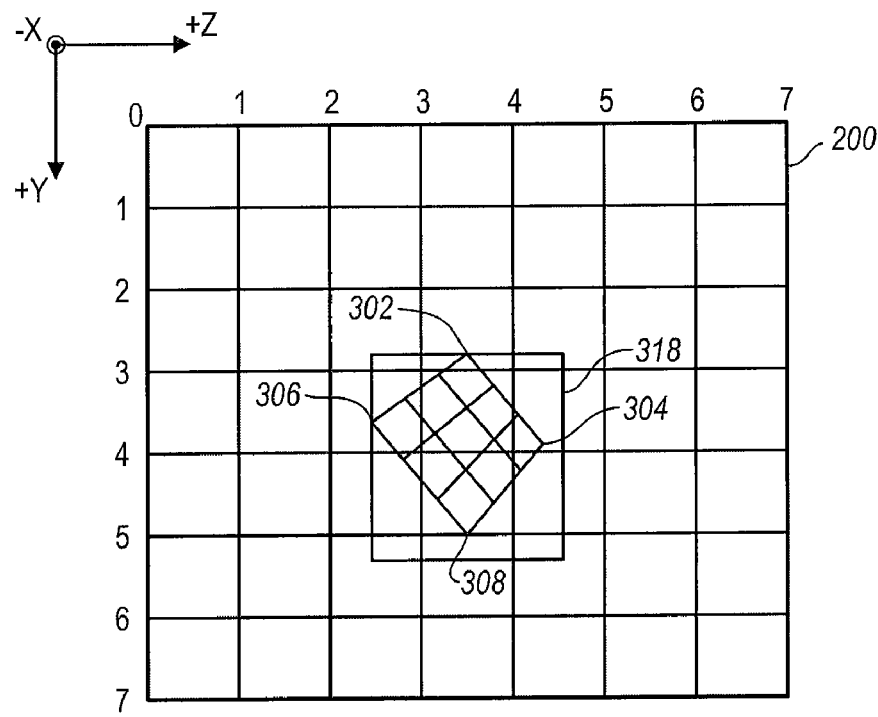

FIG. 1C illustrates the intersection of the packet 300 with a slice of the example grid 200 between X=4 and X=5. For each ray in the packet 300, there is a point (at X=4) where the ray enters the slice, and a point (at X=5) where the ray exits the slice. For example, the ray 302 enters the slice at a point 310 and exits the slice at a point 312. Similarly, the ray 308 enters the slice at a point 314 and exits the slice at a point 316. These entrance and exit points, along with the entrance and exits points of the rays 304 and 306, can be used to determine an axis aligned bounding box (AABB) 318 that encloses these rays as they pass through the slice. Were the packet 300 to include additional rays within the frustum defined by the four rays 302-308, only the entrance and exit points of the four rays 302-308 would need to be considered to determine the AABB 318 without need to consider the entrance and exit points of the additional rays. FIG. 1D illustrates a front view of the AABB 318 at X=4. FIG. 1E illustrates a rear view of the AABB 318 at X=5.

Figure 1F:
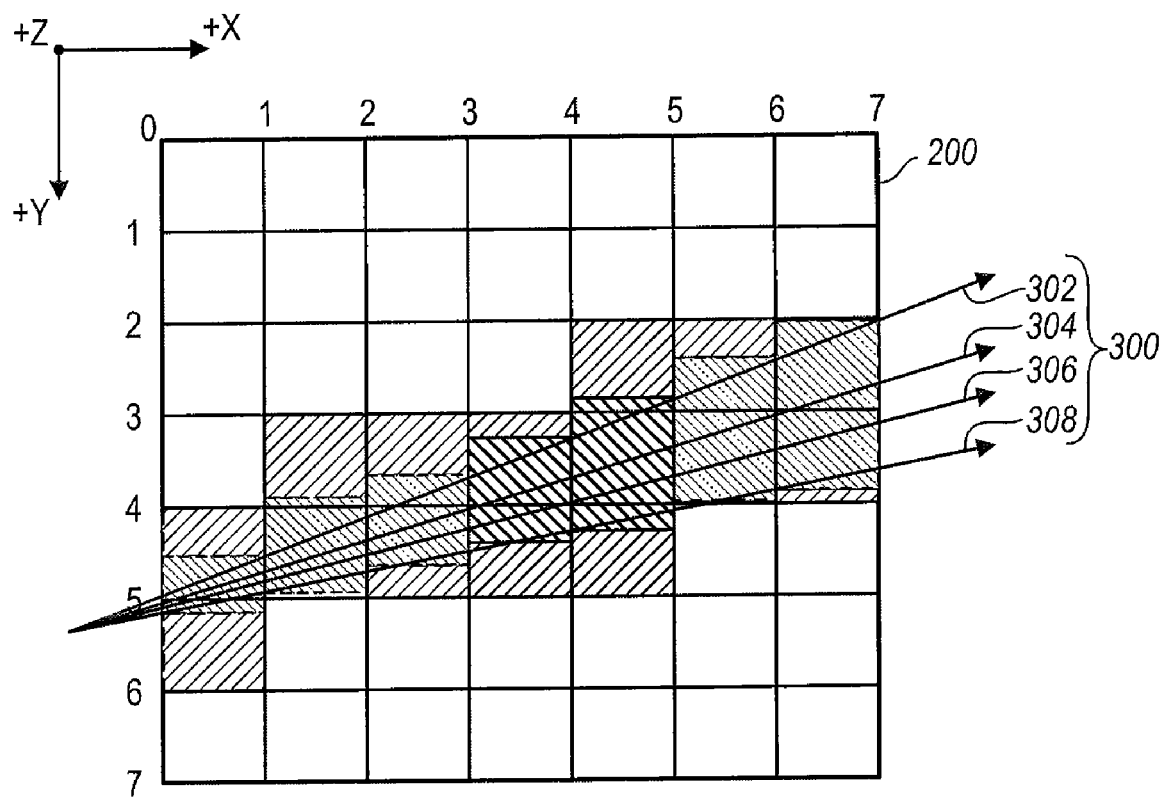
FIG. 1F is a schematic illustration of the example grid of FIGS. 1A and 1B and the example packet of rays of FIGS. 1A and 1B intersecting each slice of the grid within corresponding axis aligned bounding boxes.

As illustrated in FIG. 1F, as the packet 300 of rays is traced from one slice to the next, each AABB can be incrementally computed by simply adding the difference between the intersection points of the rays from one slice to the next. The conversion between an AABB and the cells that an AABB overlaps is also straightforward. Thus, given the packet 300 of rays 302-308 and a slice along the major traversal axis, such as the slice between X=4 and X=5, the bounding frustum of the packet 300 can be computed, and the one or more cells in the slice that are overlapped by the frustum can also be determined. Any objects at least partially bounded by the one or more cells overlapped by the frustum can then be tested for intersections with the rays.

3. Example Method for Ray Tracing a Three-Dimensional Scene

Figure 2:
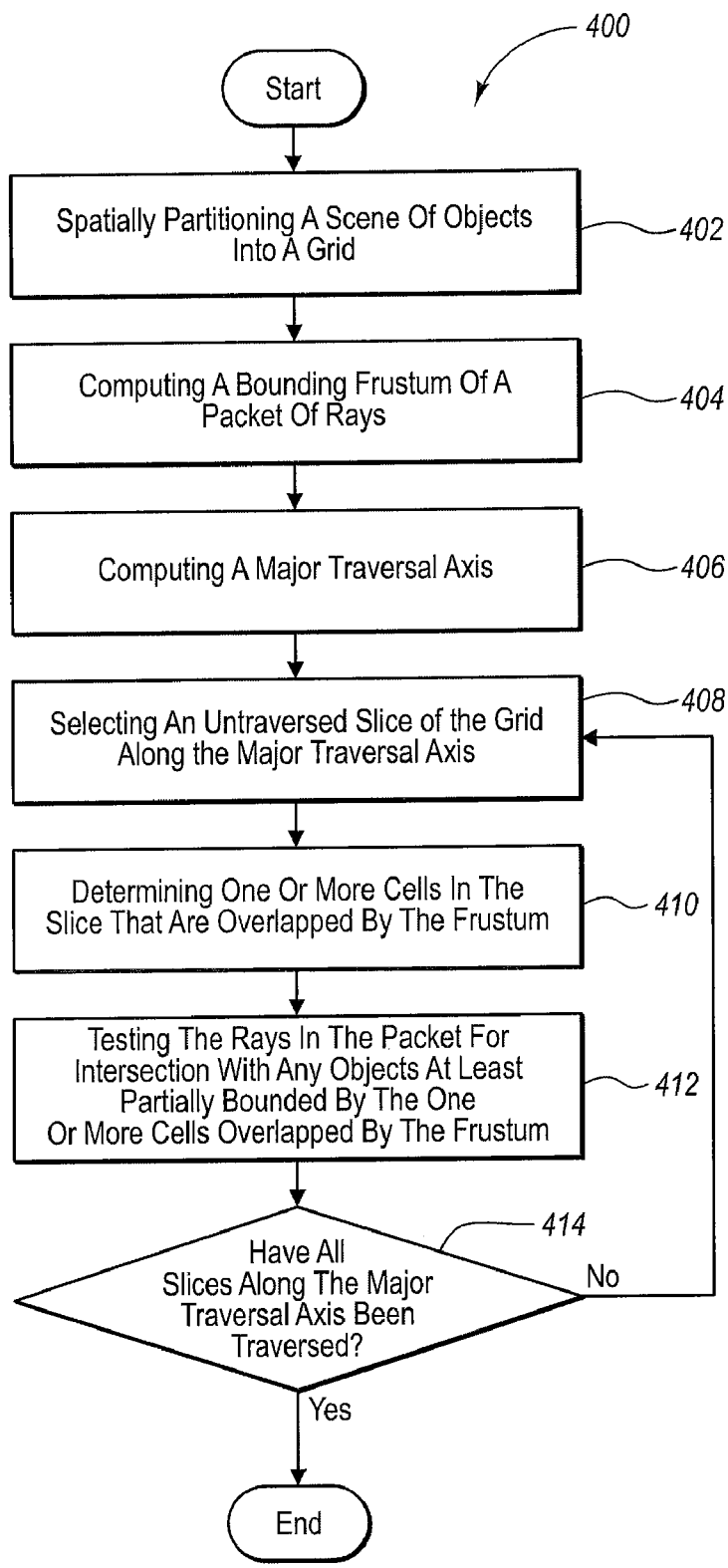
FIG. 2 is a flowchart that illustrates an example method for ray tracing a three-dimensional scene using a grid.

FIG. 2 illustrates an example method 400 for ray tracing a three-dimensional scene using a grid. As noted above, a grid includes a plurality of cells. The method 400 of FIG. 2 will be described with respect to the example scene 100 of example objects 102-116 of FIG. 1A, the example grid 200 of FIGS. 1A-1F, and the example packet 300 of rays 302-308 of FIGS. 1B-1F.

The method 400 includes an act 402 of spatially partitioning a scene of objects into a grid. For example, a ray tracing application can spatially partition the example three-dimensional scene 100 of example objects 102-116 into the example grid 200, as disclosed in FIG. 1A. Once spatially partitioned into the example grid 200, the example objects 102-116 may each be bounded by either a single cell or bounded by a group of cells. As disclosed in FIG. 1A, for example, the objects 102, 106, 108, 110, 112, and 116 are each bounded by a group of two or more cells. The partitioning and/or re-partitioning of a scene of objects into a grid can be optimized using various techniques such as, but not limited to, techniques associated with macrocells, hierarchical grids, loosely nested grids, and recursive grids. It is noted that when the method 400 is implemented in a dynamic scene, the scene of objects may be modified between each performance of the method 400.

The method 400 also includes an act 404 of computing a bounding frustum of a packet of rays. For example, a ray tracing application can compute the bounding frustum to be defined on the top by the ray 302, on the right by the ray 304, on the left by the ray 306, and on the bottom by the ray 308, as disclosed in FIGS. 1D and 1E. The bounding frustum may, for example, be substantially cone-shaped, substantially square-pyramid-shaped, or may have a cross-section of any convex or non-convex polygon.

The method 400 also includes an act 406 of computing a major traversal axis. For example, as noted above, the X axis may be computed as the major traversal axis of the packet 300 of FIGS. 1B-1F.

The method 400 also includes an act 408 of selecting a slice of the grid along a major traversal axis. For example, after several iterations of the method 400, a ray tracing application may eventually select the vertical slice of cells between X=4 and X=5 which includes 49 cells, as disclosed above in connection with FIGS. 1C-1E. Also disclosed in FIG. 1E, the ray tracing application may initially select the vertical slice of cells between X=0 and X=1, and in subsequent iterations of the act 408 may subsequently select the vertical slices of cells between X=1 and X=2, between X=2 and X=3, . . . , and between X=6 and X=7.

The method 400 also includes an act 410 of determining one or more cells in the slice that are overlapped by the frustum. For example, and as noted above in connection with FIGS. 1C-1E, a ray tracing application may initially compute an AABB 318 that bounds the packet 300 of rays as the packet passes through the slice between X=4 and X=5. The AABB 318 may then be used to determine one or more cells in the slice that are overlapped by the frustum of the packet 300. As disclosed in FIGS. 1C-1E, only the cells in the block of cells bounded by (4,2,2), (4,2,4), (4,4,4) and (4,4,4) of the slice between X=4 and X=5 are overlapped by the AABB 318. The act 410 may also determine the one or more cells in the slice that are overlapped by a bounding rectangle of the frustum or a rasterization of the exact frustrum shape.

The method 400 also includes an act 412 of testing the rays in the packet for intersection with any objects at least partially bounded by the one or more cells overlapped by the frustum. For example, as disclosed in FIG. 1A, objects 108, 110, and 116 are at least partially bounded by the cells overlapped by the frustum at the slice between X=4 and X=5. Therefore, a ray tracing application may test each of the rays 302-308 in the packet 300 of rays for intersection with the objects 108, 110, and 116.

The act 412 may include optimizations that enable a ray to be tested for intersection using a less costly test than a standard ray/object intersection test. For example, objects that lie outside the bounding frustum of the packet of rays can be rejected quite cheaply using "SIMD shaft culling" as described in—Kirill Dmitriev, Vlastimil Havran, & Hans-Peter Seidel, *Faster Ray Tracing with SIMD Shaft Culling* (December 2004) (*Research Report*, Max-Planck-Institut für Informatik, Saarbrücken, Germany)—the disclosure of which is incorporated herein by reference in its entirety. If the four "corner rays" of the frustum of the packet 300 miss the object on the same edge of the object, then all the rays must miss that object. Using the SIMD object intersection method outlined in—Ingo Wald, *Realtime Ray Tracing and Interactive Global Illumination* (2004) (Ph.D. thesis, Saarland University)—the disclosure of which is incorporated herein by reference in its entirety, intersecting the four corner rays costs roughly as much as a single SIMD 4-ray-object intersection test (referred to herein as "SIMD frustum culling"). As such, for an N-ray packet, SIMD frustum culling can result in objects outside the frustum of the packet being intersected at 4/N the cost of objects inside the frustum. Therefore, the act 412 of testing the rays in the packet for intersections can include SIMD frustum culling as part of the "testing" to make the testing more efficient and less costly. Similarly, frustum culling using a non-SIMD processor would also be of benefit to the act 412.

Another optimization that can be incorporated into the testing of the act 412 is "vertex culling," as described in—*Alexander Reshetov, Faster Ray Packets—Triangle Intersection through Vertex Culling* (September 2007) (*IEEE/EG Symposium on Interactive Ray Tracing* 2007, Sep. 10-12, 2007)—the disclosure of which is incorporated herein by reference in its entirety. Therefore, the act 412 of testing the rays in the packet for intersections can include vertex culling as part of the "testing" to make the testing more efficient and less costly.

Yet another optimization that can be incorporated into the testing of the act 412 is mailboxing. In a grid, large objects are often bounded by a group of cells. In addition, even small objects often straddle cell boundaries. Thus, many objects are often bounded by a group of cells. Since a group of cells is often made up of neighboring cells that correspond to different slices of a grid, there is a high probability that a frustum will intersect an object bounded by the group of cells multiple times. These redundant standard ray/object intersection tests may be costly, but can easily be avoided by mailboxing. Mailboxing may be implemented by assigning each packet of rays a unique identifier, and tagging each object with that identifier before the standard ray/object intersection test. If a packet visits an object already tagged with its identifier, a standard ray/object intersect test may be avoided. Mailboxing may alternatively be performed using various other known implementations, the use of which is contemplated by the methods disclosed herein. Thus, the act 412 of testing the rays in the packet for intersections can include mailboxing as part of the "testing" to make the testing more efficient and less costly.

The method 400 can further include an act of dividing packets of rays that are not coherent. For example, if at some point during the method 400 it is determined that one or more of the rays 302-308 is not coherent with the other rays, the packet 300 can be divided in order create two packets of coherent rays.

The method 400 can further include an act of recomputing the bounding frustum of the packet of rays without considering rays in the packet that are no longer active. For example, if at some point during the method 400 it is determined that one or more of the rays 302-308 is not active, the bounding frustum of the packet 300 can be recomputed without considering the one or more inactive rays in order to decrease the size of the bounding frustum.

The method 400 also includes an act 414 of determining whether all slices along the major traversal axis have been traversed. If it is determined at the act 414 that all slices along the major traversal axis have not been traversed, the method 400 repeats acts 408-414 until all slices along the major traversal axis have been traversed. For example, a ray tracing application will repeat the acts 408-414 seven times in order to ray trace the grid 200, once for each of the seven slices between X=0 and X=7, as disclosed in FIG. 1F.

The example embodiments disclosed herein can enable a three-dimensional scene to be ray traced quickly and efficiently. Specifically, the example embodiments disclosed herein can contribute to an overall ray tracing method that is a viable alternative to other rendering methods such as Z-buffering, even for applications that make use of dynamically changing scenes, such as simulation and game applications. In particular, the example embodiments disclosed herein can achieve performance using grids that was previously available only using other types of hierarchical data structures.

In addition, although aspects of the example methods disclosed herein may be used in ray tracing, various aspects of these example methods may also be employed in other tasks that require enumerating cells along a ray, such as volume rendering, in which the cells of a grid contain material information such as from a CT or MRI scanner, and in which the rays accumulate data/opacity along the traversed cells, but do not actually determine any three-dimensional ray/object intersections.

The example embodiments disclosed herein may be embodied in other specific forms. The example embodiments disclosed herein are to be considered in all respects only as illustrative and not restrictive.

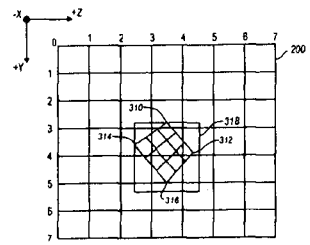

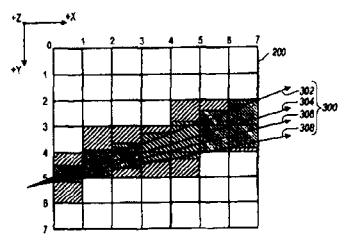

What is claimed is:

1. A method, performed by a computer system, for ray tracing a three-dimensional scene made up of objects that are spatially partitioned into a grid, the grid including a plurality of cells, the method comprising the following acts:
   a) computing, on at least one processor, a bounding frustum of a packet of rays; and
   b) traversing the grid slice by slice along a major traversal axis, each slice traversal comprising the following acts:
      i) determining one or more cells in the slice that are overlapped by the frustum; and
      ii) testing the rays in the packet for intersection with any objects at least partially bounded by the one or more cells overlapped by the frustum.

2. The method as recited in claim 1, wherein the act ii) further comprises SIMD frustum culling or vertex culling.

3. The method as recited in claim 1, wherein the act ii) further comprises mailboxing.

4. The method as recited in claim 1, wherein the rays in the packet of rays are coherent.

5. The method as recited in claim 1, wherein the grid is uniform, non-uniform, hierarchical, or recursive.

6. The method as recited in claim 1, wherein at least one cell in the grid defines a volume that is filled with a bounding box defined by an acceleration structure.

7. The method as recited in claim 1, wherein at least one of the objects is a grid, a kd-tree, a BVH, an octree, a BSP, or some combination thereof.

8. The method as recited in claim 1, wherein the act i) comprises determining the one or more cells in the slice that are overlapped by a bounding rectangle of the frustum or a rasterization of the exact frustum shape.

9. The method as recited in claim 1, wherein the frustum is substantially cone-shaped, substantially square-pyramid-shaped, or has a cross-section of any convex or non-convex polygon.

10. The method as recited in claim 1, wherein the act b) further comprises the act of:
   dividing packets of rays that are not coherent.

11. The method as recited in claim 1, wherein the act b) further comprises the act of:
   recomputing the bounding frustum of the packet of rays without considering rays in the packet that are no longer active.

12. A method, performed by a computer system, for ray tracing a three-dimensional scene made up of objects using a grid that includes a plurality of cells, the method comprising the following acts:
   a) spatially partitioning a scene of objects into a grid;
   b) computing, on at least one processor, a bounding frustum of a packet of coherent rays;
   c) traversing the grid slice by slice along a major traversal axis, each slice traversal comprising the following acts:
      i) determining one or more cells in the slice that are overlapped by the frustum; and
      ii) testing the rays in the packet for intersection with any objects at least partially bounded by the one or more cells overlapped by the frustum; and
   d) repeating acts a)-c) using an altered scene of objects.

13. The method as recited in claim 12, wherein the act ii) further comprises SIMD frustum culling or vertex culling.

14. The method as recited in claim 12, wherein the act ii) further comprises mailboxing.

15. The method as recited in claim 12, wherein the grid is uniform, non-uniform, hierarchical, or recursive.

16. The method as recited in claim 12, wherein at least one cell in the grid defines a volume that is filled with a bounding box defined by an acceleration structure.

17. The method as recited in claim 12, wherein at least one of the objects is a grid, a kd-tree, a BVH, an octree, a BSP, or some combination thereof.

18. One or more non-transitory computer-readable media having computer-readable instructions thereon which, when executed, implement a method for ray tracing a three-dimensional scene made up of objects that are spatially partitioned into a grid, the grid including a plurality of cells, the method comprising the acts of:
   a) computing a bounding frustum of a packet of rays; and
   b) traversing the grid slice by slice along a major traversal axis, each slice traversal comprising the following acts:
      i) determining one or more cells in the slice that are overlapped by the frustum; and
      ii) testing the rays in the packet for intersection with any objects at least partially bounded by the one or more cells overlapped by the frustum.

19. The one or more non-transitory computer-readable media as recited in claim 18, wherein the act ii) further comprises SIMD frustum culling or vertex culling.

20. The one or more non-transitory computer-readable media as recited in claim 18, wherein the act ii) further comprises mailboxing.

21. The one or more non-transitory computer-readable media as recited m claim 18, wherein the rays in the packet of rays are coherent.

22. The one or more non-transitory computer-readable media as recited in claim 18, wherein the grid is uniform, non-uniform, hierarchical, or recursive.

23. The one or more non-transitory computer-readable media as recited in claim 18, wherein at least one cell in the grid defines a volume that is filled with a bounding box defined by an acceleration structure.

24. The one or more non-transitory computer-readable media as recited in claim 18, wherein at least one of the objects is a grid, a kd-tree, a BVH, an octree, a BSP, or some combination thereof.

25. The one or more non-transitory computer-readable media as recited in claim 18, wherein the act i) comprises determining the one or more cells in the slice that are overlapped by a bounding rectangle of the frustum or a rasterization of the exact frustum shape.

26. The one or more non-transitory computer-readable media as recited in claim 18, wherein the frustum is substantially cone-shaped, square-pyramid-shaped, or has a cross-section of any convex or non-convex polygon.

27. The one or more non-transitory computer-readable media as recited in claim 18, wherein the act b) further comprises the act of:

dividing packets of rays that are not coherent.

28. The one or more non-transitory computer-readable media as recited in claim 18, wherein the act b) further comprises the act of:

recomputing the bounding frustum of the packet of rays without considering rays in the packet that are no longer active.

* * * * *

UNITED STATES PATENT AND TRADEMARK OFFICE
CERTIFICATE OF CORRECTION

Page 1 of 5

PATENT NO.         : 8,384,711 B2
APPLICATION NO.    : 12/515812
DATED              : February 26, 2013
INVENTOR(S)        : Wald et al.

It is certified that error appears in the above-identified patent and that said Letters Patent is hereby corrected as shown below:

Delete the title page and substitute the attached title page therefor.

Drawings
Sheet 2, replace Figure 1C with the figure depicted below, wherein reference numbers 310, 312, 314, and 316 have been added.

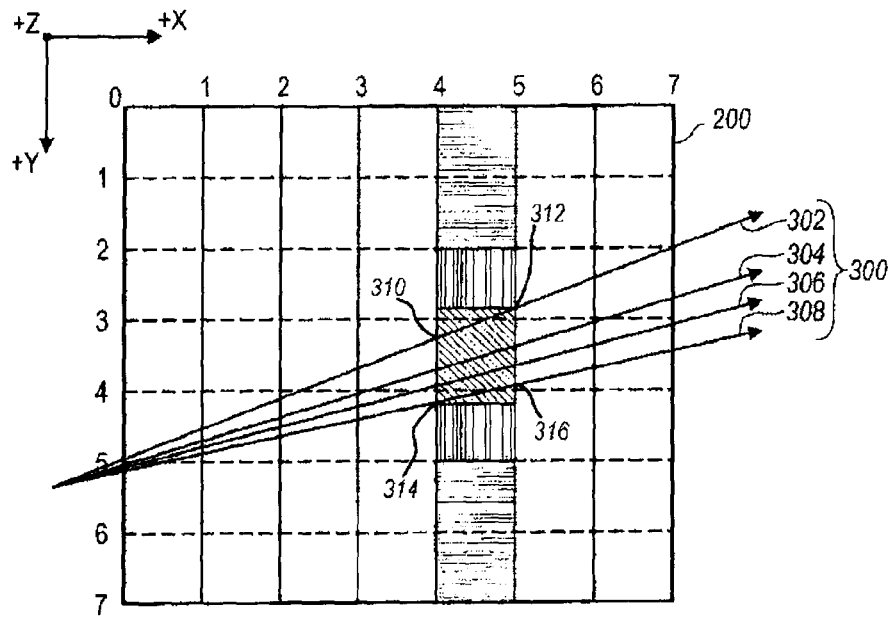

FIG. 1C

Signed and Sealed this
Twelfth Day of November, 2013

Teresa Stanek Rea
*Deputy Director of the United States Patent and Trademark Office*

CERTIFICATE OF CORRECTION (continued)
U.S. Pat. No. 8,384,711 B2

Sheet 3, replace Figure 1D with the figure depicted below, wherein incorrect reference numbers 302, 304, 306, and 308 have been replaced with numbers 310, 312, 314, and 316.

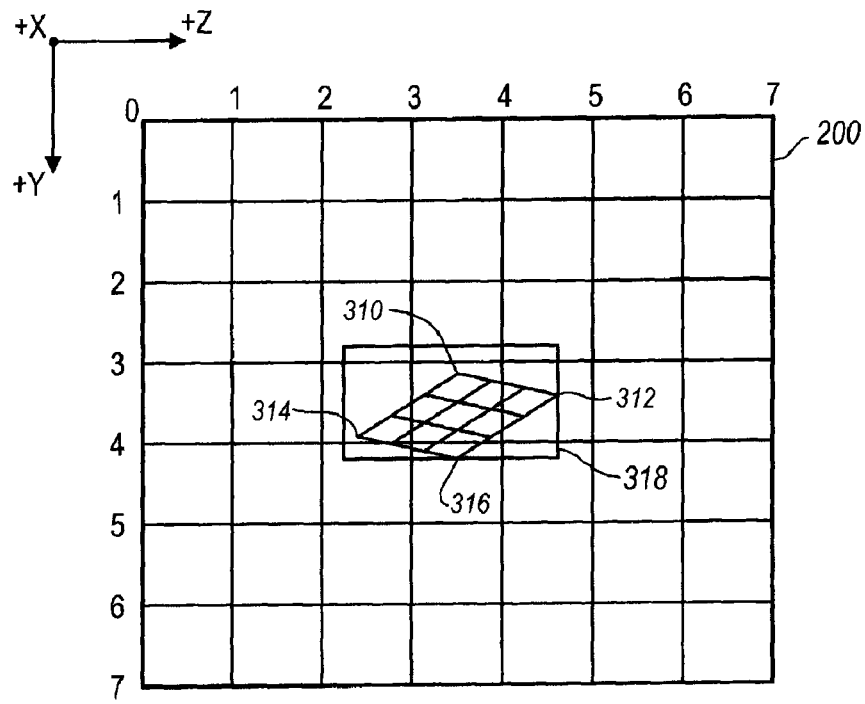

FIG. 1D

CERTIFICATE OF CORRECTION (continued)
U.S. Pat. No. 8,384,711 B2

Sheet 3, replace Figure 1E with figure depicted below, wherein incorrect reference numbers 302, 304, 306 and 308 have been replaced with numbers 310, 312, 314, and 316.

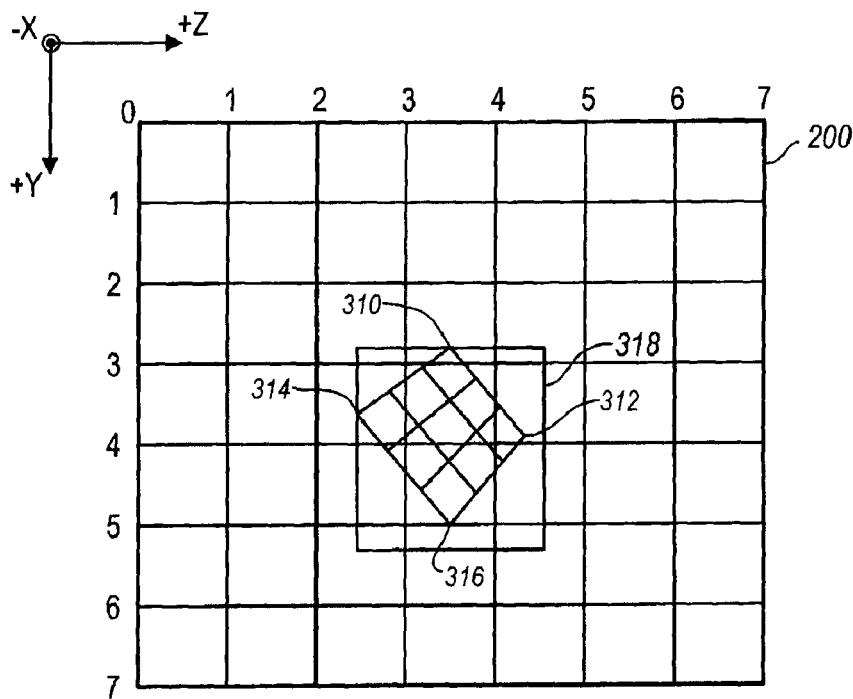

FIG. 1E

CERTIFICATE OF CORRECTION (continued)
U.S. Pat. No. 8,384,711 B2

In the Specification

Column 1
Line 8, change "having a" to --having an--.
Line 45, change "each the ray" to --each ray--.

Column 6
Line 17, change "and exits" to --and exit--.

Column 9
Line 2, change "that was" to --that were--.

In the Claims

Column 9
Line 56, change "recited m" to --recited in--.

Column 10
Line 49, change "recited m" to --recited in--.

CERTIFICATE OF CORRECTION (continued)

(12) United States Patent
Wald et al.

(10) Patent No.: US 8,384,711 B2
(45) Date of Patent: Feb. 26, 2013

(54) RAY TRACING A THREE DIMENSIONAL SCENE USING A GRID

(75) Inventors: Ingo Wald, Salt Lake City, UT (US); Santiago Ize, Salt Lake City, UT (US); Steven G. Parker, Salt Lake City, UT (US); Aaron Knoll, Sandy, UT (US)

(73) Assignee: The University of Utah Research Foundation, Salt Lake City, UT (US)

( * ) Notice: Subject to any disclaimer, the term of this patent is extended or adjusted under 35 U.S.C. 154(b) by 674 days.

(21) Appl. No.: 12/515,812

(22) PCT Filed: Nov. 29, 2007

(86) PCT No.: PCT/US2007/085965
§ 371 (c)(1),
(2), (4) Date: Jan. 20, 2010

(87) PCT Pub. No.: WO2008/067483
PCT Pub. Date: Jun. 5, 2008

(65) Prior Publication Data
US 2010/0194751 A1   Aug. 5, 2010

Related U.S. Application Data

(60) Provisional application No. 60/867,781, filed on Nov. 29, 2006.

(51) Int. Cl.
*G06T 15/00* (2011.01)
(52) U.S. Cl. ......... 345/419; 345/420; 345/421; 345/423
(58) Field of Classification Search .............. 345/419, 345/420, 421, 423
See application file for complete search history.

(56) References Cited

U.S. PATENT DOCUMENTS

| | | | |
|---|---|---|---|
| 6,556,200 B1 | 4/2003 | Pfister et al. | |
| 7,289,118 B2 * | 10/2007 | Schmittler et al. | 345/423 |
| 7,554,540 B2 | 6/2009 | Hayes | |
| 2004/0125103 A1 | 7/2004 | Kaufman | |
| 2006/0106815 A1 | 5/2006 | Timcenko | |
| 2007/0182732 A1 | 8/2007 | Woop | |
| 2007/0206008 A1 | 9/2007 | Kaufman et al. | |
| 2008/0043018 A1 | 2/2008 | Keller et al. | |

(Continued)

FOREIGN PATENT DOCUMENTS

| | | |
|---|---|---|
| WO | WO 2008/067490 | 6/2008 |
| WO | WO2008067483 | 6/2008 |

OTHER PUBLICATIONS

International Search Report from PCT/US2007/085973, dated Jun. 2, 2008, 3 pages.

(Continued)

*Primary Examiner* — Phu K Nguyen
(74) *Attorney, Agent, or Firm* — Workman Nydegger

(57) ABSTRACT

Ray tracing a three-dimensional scene using a grid. One example embodiment is a method for ray tracing a three-dimensional scene using a grid. In this example method, the three-dimensional scene is made up of objects that are spatially partitioned into a plurality of cells that make up the grid. The method includes a first act of computing a bounding frustum of a packet of rays, and a second act of traversing the grid slice by slice along a major traversal axis. Each slice traversal includes a first act of determining one or more cells in the slice that are overlapped by the frustum and a second act of testing the rays in the packet for intersection with any objects at least partially bounded by the one or more cells overlapped by the frustum.

28 Claims, 5 Drawing Sheets